(12) United States Patent
Gjerpe

(10) Patent No.: US 8,961,247 B2
(45) Date of Patent: Feb. 24, 2015

(54) POWER SUPPLY SYSTEM FOR MARINE DRILLING VESSEL

(75) Inventor: Paul Fredrik Gjerpe, Oslo (NO)

(73) Assignee: Siemens Aktiengesellschaft, Munich (DE)

( * ) Notice: Subject to any disclaimer, the term of this patent is extended or adjusted under 35 U.S.C. 154(b) by 203 days.

(21) Appl. No.: 13/639,470

(22) PCT Filed: Mar. 23, 2011

(86) PCT No.: PCT/EP2011/054402
§ 371 (c)(1),
(2), (4) Date: Oct. 4, 2012

(87) PCT Pub. No.: WO2011/124470
PCT Pub. Date: Oct. 13, 2011

(65) Prior Publication Data
US 2013/0029543 A1    Jan. 31, 2013

(30) Foreign Application Priority Data

Apr. 9, 2010 (EP) .................................... 10159486
Mar. 10, 2011 (EP) .................................... 11157747

(51) Int. Cl.
B63H 21/22 (2006.01)
H02J 3/38 (2006.01)
(Continued)

(52) U.S. Cl.
CPC .... *H02J 3/38* (2013.01); *B63J 3/04* (2013.01); *B63J 3/02* (2013.01); *B63J 3/00* (2013.01); *E21B 41/0007* (2013.01); *B63J 2003/002* (2013.01); *B63H 25/42* (2013.01)

USPC ................. 440/1; 440/6; 114/144 B; 405/224

(58) Field of Classification Search
USPC .................... 440/1, 3, 6; 405/224; 114/144 B
See application file for complete search history.

(56) References Cited

U.S. PATENT DOCUMENTS 2,966,221 A * 12/1960 Kinney ............................ 175/5
3,552,343 A     1/1971 Scott ............................ 114/293
(Continued)

FOREIGN PATENT DOCUMENTS

CN      101002376 A    7/2007 ................ H02J 3/01
CN      101014915 A    8/2007 ............. G05B 23/02
(Continued)

OTHER PUBLICATIONS

International Search Report and Written Opinion, Application No. PCT/EP2011/054402, 10 pages, Dec. 21, 2011.
(Continued)

*Primary Examiner* — Lars A Olson
*Assistant Examiner* — Jovon Hayes
(74) *Attorney, Agent, or Firm* — King & Spalding L.L.P.

(57) ABSTRACT

A power supply system for a marine drilling vessel is provided. The power supply system comprises a first power grid section coupled to a generator configured to generate electric power and further coupled to an electrically powered active heave compensator. The heave compensator is configured to raise and lower a drill string relative to the marine drilling vessel. The power supply system further comprises a second power grid section coupled to a generator configured to generate electric power and further coupled to an electrically powered thruster drive of the marine drilling vessel. The first power grid section is electrically coupled to the second power grid section.

14 Claims, 4 Drawing Sheets

(51) Int. Cl.
  *B63J 3/00*   (2006.01)
  *E21B 41/00*  (2006.01)
  *B63J 3/04*       (2006.01)
  *B63J 3/02*       (2006.01)
  *B63H 25/42*      (2006.01)

(56) References Cited

U.S. PATENT DOCUMENTS

| | | | |
|---|---|---|---|
| 3,653,636 A | | 4/1972 | Burrell ............... 254/270 |
| 3,804,183 A | * | 4/1974 | Duncan et al. ............ 175/5 |
| 4,167,147 A | * | 9/1979 | Bergman ............... 114/122 |
| 4,205,379 A | | 5/1980 | Fox et al. ............... 701/116 |
| 4,232,903 A | * | 11/1980 | Welling et al. ............ 299/8 |
| 4,301,760 A | | 11/1981 | Cassone et al. ......... 114/144 B |
| 4,516,882 A | * | 5/1985 | Brewer et al. ............ 405/224 |
| 5,894,895 A | | 4/1999 | Welsh ..................... 175/5 |
| 6,374,519 B1 | * | 4/2002 | Beaumont ............... 37/307 |
| 6,886,487 B2 | | 5/2005 | Fischer, III ............ 114/230.1 |
| 6,932,326 B1 | * | 8/2005 | Krabbendam ........... 254/334 |
| 7,514,898 B2 | | 4/2009 | Djuve et al. ............ 318/771 |
| 7,958,715 B2 | * | 6/2011 | Kinert et al. ............. 59/78 |
| 8,008,885 B2 | * | 8/2011 | Jones et al. ............ 318/800 |
| 8,513,911 B2 | * | 8/2013 | Jones et al. ............ 318/800 |
| 2006/0064211 A1 | | 3/2006 | Johansen et al. ............ 701/21 |
| 2009/0195074 A1 | * | 8/2009 | Buiel ..................... 307/48 |
| 2009/0208295 A1 | * | 8/2009 | Kinert et al. ............ 405/224.2 |
| 2010/0009578 A1 | * | 1/2010 | Daum et al. ............... 440/1 |
| 2011/0183554 A1 | * | 7/2011 | Daum et al. ............... 440/1 |
| 2013/0029543 A1 | * | 1/2013 | Gjerpe ..................... 440/1 |

FOREIGN PATENT DOCUMENTS

| | | | |
|---|---|---|---|
| WO | 2005/119892 A1 | 12/2005 | ......... H02J 3/01 |
| WO | 2010/092113 A1 | 8/2010 | ......... H02J 3/38 |
| WO | 2011/124470 A2 | 10/2011 | ......... B63H 23/24 |

OTHER PUBLICATIONS

International Search Report and Written Opinion, Application No. PCT/EP2011/054114, 9 pages, Dec. 21, 2011.

Chinese Office Action, Application No. 201180018250.2, 14 pages, Jun. 27, 2014.

Chinese Office Action, Application No. 201180028237.5, 9 pages, Jul. 24, 2014.

* cited by examiner

POWER SUPPLY SYSTEM FOR MARINE DRILLING VESSEL

CROSS-REFERENCE TO RELATED APPLICATIONS

This application is a U.S. National Stage Application of International Application No. PCT/EP2011/054402 filed Mar. 23, 2011, which designates the United States of America, and claims priority to EP Patent Application No. 10159486.9 filed Apr. 9, 2010 and EP Patent Application No. 11157747.4 filed Mar. 10, 2011. The contents of which are hereby incorporated by reference in their entirety.

TECHNICAL FIELD

This disclosure relates to a power supply system for a marine drilling vessel and to a method of operating such power supply system.

BACKGROUND

In offshore oil production, marine drilling vessels such as offshore platforms/drilling rigs or drillships are used for exploratory offshore drilling and for drilling offshore wells. Several technical difficulties are involved in offshore drilling.

One difficulty is the requirement of the vessel to precisely keep its position above the drilling site at the seabed during a drilling operation. Modern vessels comprise dynamic positioning systems which use several sensors for position determination. This information is then used to independently control several thrusters of the vessel so that horizontal movements relative to the seabed are minimized. An offshore drilling rig may for example comprise 6-8 azimuth thrusters allowing a precise positioning of the vessel. The thrusters are operated continuously when the dynamic positioning system is active.

A further difficulty is the vertical movement (heave) of the marine drilling vessel. The heave motion of the vessel is caused by sea waves and changes the distance between the vessel and the seabed. In a drilling operation, this motion causes the weight on the drill string to change. Conventional drilling vessels were thus only able to drill in calm seas.

To reduce the amount of downtime and enable the drilling even when larger waves prevail, passive and active heave compensation were introduced. In heave compensation, the weight on the drill bit (WOB, weight on bit) at the bottom hole assembly of the drill string is kept as constant as possible. This is achieved by allowing the drill string to move relative to the drilling vessel such that the drill string remains almost stationary relative to the seabed (e.g. a relative movement of only several centimeters).

The drill string can for example be raised and lowered relative to the vessel by means of heave compensating drawworks. The drawworks comprises a spool or winch drum driven by electric motors for paying in and out of drill line. The drill line is used to raise and lower a travelling block to which the drill string is attached. For heave compensation, the drill line is reeled in and out periodically to achieve an almost constant weight on bit. When lowering the drill string, the electric motors need to be slowed down. This is achieved by burning up electric energy produced by the motors in water cooled braking resistors. When raising the drill string, the electric motors of the drawworks require a substantial amount of electric power to be operated.

It is desirable to reduce the energy consumption of the drilling vessel. Further, the water cooled braking resistors are heavy and require a substantial amount of space, while not having any further useful function. It is also desirable to avoid peaks in the power consumption on the drilling vessel, as such peaks make the energy production by means of generators less efficient (as the generators need to operate outside the most efficient range) and furthermore require the power supply of the drilling vessel to be designed for larger loads.

SUMMARY

In one embodiment, a power supply system for a marine drilling vessel may comprise: a first power grid section coupled to a generator adapted to generate electric power and further coupled to an electrically powered active heave compensator adapted to raise and lower a drill string relative to the marine drilling vessel, wherein the active heave compensator is configured to generate electric power when lowering the drill string, and a second power grid section coupled to a generator adapted to generate electric power and further coupled to an electrically powered thruster drive of the marine drilling vessel, wherein the first power grid section is electrically coupled to the second power grid section, the power supply system being adapted to supply electric power generated by the active heave compensator during heave compensation to the thruster drive for operating the thruster drive.

In a further embodiment, the active heave compensator is a heave compensating drawworks comprising one or more electric motors. In a further embodiment, the first power grid section comprises an AC bus operating at a predetermined AC frequency, wherein the electric motor of the heave compensating drawworks is an AC electric motor and is coupled to the AC bus via a variable speed drive, the variable speed drive comprising an active rectifier and being adapted to convert electric power generated by the AC electric motor to electric power having a frequency that is substantially equal to the frequency at which the AC bus is operated. In a further embodiment, the power supply system further comprises a control unit adapted to control the flow of electric power in the power supply system in such a way that electric power generated by the active heave compensator is supplied to the thruster drive. In a further embodiment, the active heave compensator is adapted to compensate for a heave motion of the marine drilling vessel caused by sea waves, wherein a heave compensation cycle comprises a first phase in which the drill string is raised and the active heave compensator consumes electric power and a second phase in which the drill string is lowered and the active heave compensator generates electric power, wherein the power supply system is adapted to supply the electric power generated during the second phase to the thruster drive. In a further embodiment, the power supply system further comprises a control unit adapted to operate the thruster drive at a lower power during the first phase of the heave compensation cycle and at a higher power during the second phase of the heave compensation cycle. In a further embodiment, the thruster drive is part of a propulsion system of the marine drilling vessel, the propulsion system comprising a dynamic positioning system, wherein the power supply system is adapted so as to supply an average electric power to the thruster drive that is above a threshold power required by the dynamic positioning system for position keeping. In a further embodiment, the power supply system is configured to control the supply of electric power to the thruster drive in such a way that the sum of the electric power consumed by the thruster drive and of the electric power consumed and generated by the active heave compensator is substantially constant over a heave compensation cycle.

In another embodiment, a method of controlling a power supply system of a marine drilling vessel is provided, the power supply system comprising a first power grid section coupled to a generator adapted to generate electric power and further coupled to an electrically powered active heave compensator adapted to raise and lower a drill string relative to the marine drilling vessel, wherein the active heave compensator is configured to generate electric power when lowering the drill string and a second power grid section coupled to a generator adapted to generate electric power and further coupled to an electrically powered thruster drive of the marine drilling vessel, wherein the first power grid section is electrically coupled to the second power grid section, the method comprises: generating electric power by means of the active heave compensator when the active heave compensator lowers the drill string during heave compensation, supplying the generated electric power to the thruster drive, and operating the thruster drive with the supplied electric power.

In a further embodiment, the active heave compensator is adapted to compensate for a heave motion of the marine drilling vessel caused by sea waves, wherein a heave compensation cycle comprises a first phase in which the drill string is raised and the active heave compensator consumes electric power and a second phase in which the drill string is lowered and the active heave compensator generates electric power, wherein the step of supplying the generated electric power to the thruster drive is performed during the second phase of the heave compensation cycle. In a further embodiment, the method further comprises controlling the operation of the thruster drive such that the thruster drive is operated at a lower power during the first phase of the heave compensation cycle and at a higher power during the second phase of the heave compensation cycle. In a further embodiment, the thruster drive is part of a propulsion system of the marine drilling vessel, the propulsion system comprising a dynamic positioning system, and the method further comprises controlling the supply of electric power to the thruster drive in such a way that an average electric power is supplied to the thruster drive that is above a threshold electric power required by the dynamic positioning system for position keeping. In a further embodiment, the method further comprises controlling the supply of electric power to the thruster drive in such a way that the sum of the electric power consumed by the thruster drive and of the electric power consumed and generated by the active heave compensator is substantially constant over a heave compensation cycle. In a further embodiment, the method further comprises controlling the supply of electric power to the thruster drive in such a way that the load on the one or more generators coupled to the first and second power grid sections is substantially constant over a heave compensation cycle.

BRIEF DESCRIPTION OF THE DRAWINGS

Example embodiments will be explained in more detail below with reference to figures, in which.

DETAILED DESCRIPTION

Figure 1:
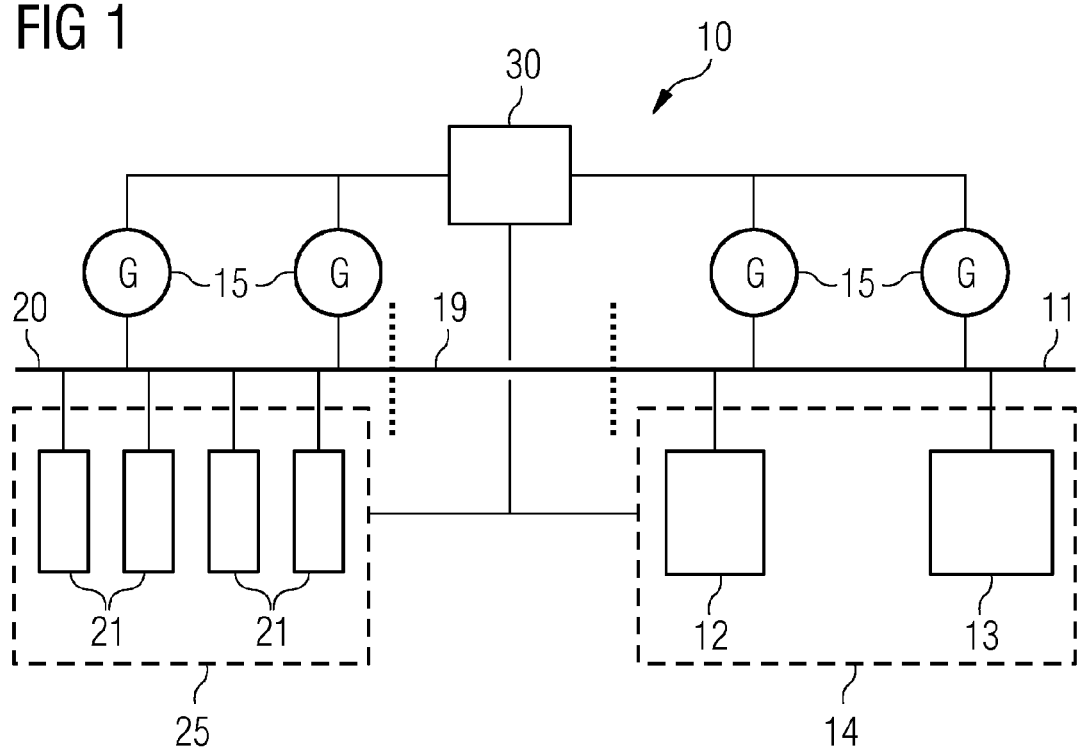
FIG. 1 is a schematic block diagram illustrating a power supply system according to one embodiment.

Some embodiments provide an improved power supply system that mitigates at least some of the drawbacks mentioned above.

For example, some embodiments provide a power supply system for a marine drilling vessel is provided. The power supply system comprises a first power grid section coupled to a generator adapted to generate electric power and further coupled to an electrically powered active heave compensator adapted to raise and lower a drill string relative to the marine drilling vessel. The active heave compensator is configured to generate electric power when lowering the drill string. The power supply system further comprises a second power grid section coupled to a generator adapted to generate electric power and further coupled to an electrically powered thruster drive of the marine drilling vessel. The first power grid section is electrically coupled to the second power grid section. The power supply system is adapted to supply electric power generated by the active heave compensator during heave compensation to the thruster drive for operating the thruster drive.

The first and second power grid sections may be coupled to the same generator or to different generators. By powering the thruster drive with electric power produced by the active heave compensator, the energy consumption of the marine drilling vessel can be reduced. Further, as the generated electric power is used by the thruster drive, smaller braking resistors can be provided or braking resistors may not be required at all. Space and weight are thus saved as well as costs involved with providing such braking resistors.

In one embodiment, the active heave compensator is a heave compensating drawworks comprising one or more electric motors. When lowering the drill string by paying out drill line, electric power can be produced when braking the electric motor(s) (i.e. the electric motor can be slowed down draining electric power from the electric motor). The drawworks can comprise a winch drum which is rotated by the one or more electric motors and on which the drill line is reeled up. The drill line may run through a crown block and a travelling block of a drill rig of the marine drilling vessel, the drill string being attached to the travelling block.

The first power grid section may comprise an alternating current (AC) bus operating at a predetermined AC frequency. The electric motor of the heave compensating drawworks may be an AC electric motor and may be coupled to the AC bus via a variable speed drive. The variable speed drive may comprise an active rectifier and may be adapted to convert electric power generated by the AC electric motor to electric power having a frequency that is substantially equal to the frequency at which the AC bus is operated. The power generated by the heave compensating drawworks can thus efficiently be fed back into the power grid of the marine drilling vessel.

Other possibilities are certainly conceivable. The power supply system may for example comprise a four quadrant converter adapted to convert (generated) electric power by the active heave compensator so as to enable a refeeding of the generated electric power into the power grid, e.g. by adjusting the frequency of the generated electric power to the frequency at which the vessel's power grid is operated.

The first and second power grid sections may be part of a power grid of the marine drilling vessel. The coupling of these sections may provide that electric power can be transferred from one section to the other. As the power grid sections are electrically coupled, the generator providing both sections with electric power may be the same. The power grid sections may for example be coupled to 1-10 generators.

In one embodiment, the power supply system further comprises a control unit adapted to control the flow of electric power in the power supply system in such a way that electric power generated by the active heave compensator is supplied to the thruster drive. The control unit may for example control one or a combination of the following: the electric power output of one or more generators, the electric power supply to the thruster drive and the electric power supply to a braking resistor, if such braking resistor is present at all. Fuel savings may thus be achieved, as the control unit may for example operate the generators at a relatively constant load by operating the thruster drive anti-cyclic to the active heave compensator.

The active heave compensator is generally adapted to compensate for a heave motion of the marine drilling vessel caused by sea waves. A heave compensation cycle may comprise a first phase in which the drill string is raised relative to the vessel and the active heave compensator consumes electric power and may further comprise a second phase in which the drill string is lowered relative to the vessel and the active heave compensator generates electric power. The power supply system may be adapted to supply the electric power generated during the second phase to the thruster drive. In the second phase, the thruster drive may thus be operated with a higher power output without the requirement to operate one or more generators at a higher load and thus to burn additional fuel in the generators.

Note that the electric power may only be generated during a part of the second phase of the heave compensation cycle, e.g. when the movement of the drill string relative to the marine drilling vessel is slowed down.

In particular, a control unit may be provided which is adapted to operate the thruster drive at a low power during the first phase of the heave compensation cycle and at a higher power during the second phase of the heave compensation cycle. Accordingly, the thruster drive may consume less electric power when the active heave compensator requires large amounts of electric power for lifting the drill string, while more electric power may be consumed by the thruster drive then the drill string is lowered, thereby generating electric power in the active heave compensator. While the average electric power supplied to the thruster drive may be kept almost unchanged, the total power consumption can be reduced and the generators can be operated at a more constant power output. Further, such configuration of the power supply system may result in an inherent self stabilisation of the motion of the marine drilling vessel in waves. When the waves lift the vessel, the active heave compensator may lower the drill string thus producing energy. At the same time, the horizontal forces applied to the vessel by the waves are relatively large, which can be countered by the increased output power of the thruster drive during this second phase of the heave compensation cycle. The thruster drive can thus be supplied with the additional electric power right at the moment when it is required for position keeping.

In one embodiment, the thruster drive is part of the propulsion system of the marine drilling vessel. The propulsion system may comprise a dynamic positioning system, and the power supply system may be adapted so as to supply an average electric power to the thruster drive that is above a threshold power required by the dynamic positioning system for position keeping. This way, a dynamic positioning may become possible even though the thruster drive is not operated with a constant power output, but with a power output that increases when the active heave compensator generates electric energy. The above mentioned inherent self-stabilisation may further improve the operation of the dynamic positioning system. The dynamic positioning system may be part of a control system controlling the operation of the thruster drives.

The power supply system may be configured to control the supply of electric power to the thruster drive in such a way that the sum of the electric power consumed by the thruster drive and of the electric power consumed and generated by the active heave compensator is substantially constant over a heave compensation cycle. The operation of the thruster drive can thus be adjusted in accordance with the power demands of the active heave compensator. This may result in a more constant load on the generators and thus in a more efficient operation of the generators. In other configurations, the supply of electric power to the thruster drive may be controlled in such a way that the cumulative power consumption of the thruster drive and a drilling drive system, which may comprise the active heave compensator, and which may comprise further energy consuming components, is kept constant.

In other embodiments, it is also possible to adjust the supply of electric power to the thruster drive in such a way that the load on the one or more generators connected to the first and second power grid sections is kept substantially constant. The power supply system may thus active a constant and fuel efficient operation of the generators even if additional loads draw electric power from the power grid.

In other embodiments, the power supply system may further comprise the above described components coupled to the first and/or second power grid sections, i.e. it may comprise one or a combination of the active heave compensator, the generator(s) and the thruster drive(s).

Other embodiments provide a method of controlling a power supply system of a marine drilling vessel. The power supply system comprises a fist power grid section coupled to a generator adapted to generate electric power and further coupled to an electrically powered active heave compensator adapted to raise and lower a drill string relative to the marine drilling vessel. The active heave compensator is configured to generate electric power when lowering the drill string. The power supply system further comprises a second power grid section coupled to the generator adapted to generate electric power and further coupled to an electrically powered thruster drive of the marine drilling vessel. The first power grid section is electrically coupled to the second power grid section. The method comprises the steps of generating electric power by means of the active heave compensator when the active heave compensator lowers the drill string during heave compensation, supplying the generated electric power to the thruster drive and operating the thruster drive with the supplied electric power.

With the disclosed method, advantages similar to the ones outlined further above with respect to the power supply system may be achieved.

In one embodiment of the method, the active heave compensator is adapted to compensate for a heave motion of the marine drilling vessel caused by sea waves, wherein a heave compensation cycle comprises a first phase in which the drill string is raised and the active heave compensator consumes electric power and a second phase in which the drill string is lowered and the active heave compensator generates electric power. The step of supplying the generated electric power to the thruster drive is performed during the second phase of the heave compensation cycle.

The operation of the thruster drive may be controlled in such a way that the thruster drive is operated at a lower power during the first phase of the heave compensation cycle and at a higher power during the second phase of the heave compensation cycle. The load on the one or more generators can thus be made more constant.

The thruster drive may be part of a propulsion system of the marine vessel which comprises a dynamic positioning system. The method may further comprise the step of controlling the supply of electric power to the thruster drive in such a way that an average electric power is supplied to the thruster drive that is above a threshold electric power required by the dynamic positioning system for position keeping. In particular, the supply of electric power to the thruster drive can be controlled such that the average thrust remains unchanged compared to a situation in which the thruster drive is operated with a constant supply of electric power.

In one embodiment, the method further comprises the step of controlling the supply of electric power to the thruster drive in such a way that the sum of the electric power consumed by the thruster drive and of the electric power consumed and generated by the active heave compensator is substantially constant over a heave compensation cycle. The power consumption/generation by the active heave compensator, e.g. a heave compensating drawworks, is generally determined by the requirement to maintain a constant weight on bit. By an anti-cyclic operation by the thruster drive, the total electric power consumption can thus be kept relatively constant. Besides a more energy efficient operation, the more constant load on the generator also leads to a more stable frequency on the power grid and a reduced need for maintenance due to less wear on the generators compared to an operation with fluctuating loads.

In a further embodiment, the method may comprise the step of controlling the supply of electric power to the thruster drive in such a way that the load on the one or more generators coupled to the first and second power grid sections is substantially constant over a heave compensation cycle. This may provide a more constant load on the one or more generators even if additional electric power consuming components are connected to the power grid.

The controlling steps may for example be performed by the above mentioned control unit.

In one embodiment of the method, the power supply system is configured as described above.

In the following, the example embodiments illustrated in the FIGS. 1-8 are described in more detail. It should be clear that the following description is only illustrative and non restrictive. The drawings are only schematic representations, and elements in the drawings are not necessarily to scale with each other. Functional blocks or units shown in the drawings do not necessarily imply that these are to be implemented in a single physical unit, block, circuit, chip or the like, but a single functional block or unit may be implemented in several physically separate units, while two or more separately illustrated functional blocks or units may be implemented in a single physical unit, such as a microprocessor which can implement several control units or the like.

It should be noted that the direct coupling between two blocks, units, elements or the like shown in the drawings may also be implemented as an indirect coupling, i.e., a coupling with intervening elements. These may for example be control elements, protective elements such as fuses or circuit breakers or the like.

FIG. 1 illustrates a power supply system 10 according to an example embodiment. Power supply system 10 comprises a first power grid section 11 and a second power grid section 20. Both power grid sections are part of a power grid of the marine drilling vessel. The first power grid section is coupled to two generators 15 which produce electric energy. Generators 15 may for example include Diesel engines, gas turbines or the like. The first power grid section 11 is further coupled to the drilling drive system 14. Drilling drive system 14 may comprise several electrically powered components employed in a drilling operation. In the embodiment of FIG. 1, drilling drive system 14 comprises the active heave compensator 12 and as a further exemplary component the top drive 13. Other components that may be included in drilling drive system 14 may for example comprise a mud pump, an anchor winch drive and the like. Active heave compensator 12 can for example be implemented as a heave compensating drawworks, which can comprise a winch drum that can be rotated by one or more electric motors, and which can perform heave compensation by reeling in and reeling out drill line by rotating the winch drum, thereby raising or lowering the drill string relative to the marine drilling vessel.

In operation, the generators 15 generate electric power which is supplied to the drilling drive system 14 by means of the first power grid section 11. The components of drilling drive system 14 are operated with the supplied electric power and perform their respective functions. Active heave compensator 12 controls or assists in controlling the movement of the drill string relative to the marine drilling vessel. Sea waves lift and lower the vessel, thereby changing the distance between the vessel and the seabed. The active heave compensation ensures that the vertical position of the drill string relative to seabed remains substantially constant. In particular, the weight on bit is kept as constant as possible, thereby enabling a continuation of the drilling operation even in rougher seas. When the vessel moves from a crest of a wave to a wave trough, the drill string needs to be raised relative to the vessel, whereby the active heave compensator 12 consumes electric power generated by the generators 15. On the other hand, if the vessel moves from a wave trough to a crest, the drill string is lowered and needs to be braked.

Active heave compensator 12 is adapted to generate electric power when the drill string is lowered. When implemented as a heave compensating draw works, the electric motors of the draw works need to rotate when lowering the drill string relative to the vessel. When lowering the drill string and at the end of this heave compensation cycle, the rotation of the electric motors needs to be slowed down or braked, which can be achieved by drawing electric power from the rotating electric motors. The electric motors thus operate as generators. Electric power may be generated during the whole period of reeling out drilling line or only at the end of the phase when slowing down the electric motors. Additional braking systems may certainly also be provided.

Note that a heave compensating drawworks is only one example of an active heave compensator 12 that is capable of generating energy. Furthermore, it is also conceivable to combine the active heave compensator with a passive heave compensator, thereby reducing the load on the active heave compensator and reducing the electric power required for heave compensation. Passive heave compensators that may be employed are known to the skilled person and will thus not be elaborated herein in any further detail.

The drilling vessel comprising the power supply system 10 is a vessel of a type in which the power supply for the drilling drive system 14 and the power supply for the thruster drive system 25 are separate systems. The first section 11 and the second section 20 of the power grid of the vessel are thus also separate in a conventional configuration. The generators 15 of supplying the power to the drilling drive system 14 are accordingly faced with strongly fluctuating loads, in particular with a load that rises periodically with the frequency of the waves. Operating the generators at varying loads results in an extensive fuel consumption of the generators, as they will need to be driven outside their most efficient operating range and with fluctuating rotation speeds (rpms). The fluctuating load can further lead to a higher wear resulting in increased maintenance requirements.

In the example of FIG. 1, the second power grid section 20 is again coupled to two generators 15. It is further coupled to several thruster drives 21. The drilling vessel may for example be provided with 6 to 8 thrusters, which may be potted Azimuth-thrusters each comprising their own thruster drive. Each thruster drive comprises an electric motor. The electric motor may for example have a power rating in the range of 1 MW to 6 MW. In FIG. 1, the thruster drives 21 are grouped into the thruster drive system 25.

In operation, electric power generated by generators 15 is supplied to the thruster drives 21 via power grid section 20 in order to propel the vessel. During a drilling operation, the marine drilling vessel is generally required to maintain its position above the drilling site. For this purpose, the marine drilling vessel may be equipped with a dynamic positioning system (not shown) which can be used to control the thruster drives 21 such that the vessel maintains its position above the drilling site even in heavier weather conditions, e.g. in the presence of wind and current.

In the above mentioned conventional configuration, the power grid section 20 is separate from other parts of the power grid and the thruster drives 21 are operated at a relative constant power output. The power output of the thruster drives 21 may certainly be adjusted with changing weather conditions, yet on a shorter time scale, e.g. over a heave compensation cycle, the power output is kept relatively constant. The load on generators 15 coupled to power grid section 20 is thus also relatively constant.

Note that in some configurations, a power grid section may actually be subdivided in two or further separate grid sections, for example during DP (dynamic positioning) class 3 operation. This provides a certain degree of redundancy so that a failure in one power grid section does not affect the others.

In the embodiment of FIG. 1, the first power grid section 11 is electrically coupled to second power grid section 20. This enables a flow of electric power from one section of the power grid to the other. Each power grid section may for example comprise an AC (alternating current) Bus, and these two Buses may be coupled by a suitable cable or the like. In other configurations, a common AC Bus may be established.

In the example of FIG. 1, a common AC Bus 19 is provided, towards which the generators 15 are coupled. Fewer or more generators may be coupled to the AC Bus 19. While in some embodiments, only one generator may be provided, other embodiments may use more generators, e.g. between 5 and 10 generators to power the drilling drive system 14 and the thruster drive system 25. First and second power grid sections 11 and 20 may be separable, e.g. by breakers, such as a Bus bar breaker or the like. A generator may for example have a power rating between 2 and 10 MW, so that a total electric power of 10 to 100 mW may be provided, e.g for a semi-submersible marine drilling vessel.

In the embodiment of FIG. 1, the power supply system 10 comprises a control unit 30. The functional unit 30 controls the operation of the generators 15, the drilling drive system 14 and the thruster drive system 25. Note that in an actual implementation, functional unit 30 may be split into several physical control units, which may be separate and which may be connected by a control network or the like. Control unit 30 may further comprise the controller of the dynamic positioning system which controls the thruster drive 21 such that the marine drilling vessel maintains a stable position.

Control unit 30 may for example comprise a first controller controlling the operation of the active heave compensator 12, a second controller for controlling the generators 15 and a third controller for controlling the thruster drive system 25. Control unit 30 thus has the information available on how much power is required or produced by active heave compensator 12.

In the second heave compensation cycle, when the drill string is lowered relative to the drilling vessel and when active heave compensator 12 generates energy, the control unit 30 is configured to maintain the power output of generators 15 at a substantially constant level, and to increase the power output of one or more of the thruster drives 21 in order to use up the additional electric power generated by the active heave compensator 12. The dynamic positioning system can adjust the average output power of the thruster drives 21 such that the vessel keeps a stable position. As the motion of the drilling vessel in the waves is periodic, the energy required and generated by active heave compensator 12 can be predicted to within a certain margin. This information can be provided to the dynamic positioning system which can control the thrusters of the drilling vessel such that the position above the drilling site is maintained even when the output power of the thruster drives 21 is periodically fluctuating.

Due to the additional power supply to the thruster drives 21 during the second phase of the heave compensation cycle, less electric power needs to be supplied to the thruster drives in the first phase of the cycle, so that in total, energy can be saved.

In this configuration, both the thruster drives 21 and the active heave compensator 12 are operated in the first heave compensation phase, so that a higher load is applied to generators 15. Control unit 30 may now be configured in such a way that also during the first phase of the heave compensation cycle, the sum of the electric power requirements of the active heave compensator 12 and the thruster drives 21 remains essentially constant. When the active heave compensator 12 requires electric power in order to lift the drill string relative to the marine drilling vessel, control unit 30 can reduce the power output of one or more thruster drives 21. This way, the load on generators 15 that originates from the thruster drives and the active heave compensator remains essentially constant over the whole heave compensation cycle. Thruster drives 21 thus have a lower power output during the first phase of the heave compensation cycle and a higher output during the second phase. Control unit 30 can adjust the average power output such that it is sufficient for position keeping by the dynamic positioning system.

The fluctuating power output of the thrusters will not compromise the dynamic positioning as the heave compensation cycles are relatively short e.g. between 5 and 25 seconds. Further, when a wave hits the drilling vessel, it not only heaves the vessel, which is the time at which the active heave compensator generates energy (second phase), but it also applies a force in the horizontal direction. This can be countered by the operation of the thruster drives with increased output power, thus resulting in an inherent self-stabilisation of the marine drilling vessel.

In a further configuration of control unit 30, not only the power generation/consumption of thruster drives 21 and of active heave compensator 12 may be considered, but also the electric power requirements of other components coupled to the power grid, e.g. of components of drilling drive system 14 such as the electric motor of the top drive or Kelly drive 13. Control unit 30 is then configured to adjust the electric power consumed by thruster drives 21 in such a way that the total electric power consumption on the power grid remains essentially constant. Thus, the load on generators 15 can be made even more constant, which may provide a better fuel economy of the generators and reduced maintenance requirements. Furthermore, with varying loads, the frequency on the power grid will also vary. Accordingly, by making the load relatively constant, the frequency on the power grid can also be made more stable.

Note that 'substantially constant' or 'relatively constant' does not mean that the combined power consumption (thruster drive and active heave compensator) or the load on the generators is essentially a flat curve over time. It only means that on a time scale of a heave compensation cycle, fluctuations in the combined power consumption or in the load applied to the generators are relatively small compared to the fluctuations in the electric power demand of the active heave compensator.

It should be clear that FIG. 1 shows only an exemplary configuration of the power supply system 10 and of the electric components coupled thereto. Other configurations are certainly conceivable, such as the provisioning of only one generator 15 or a different number of generators, e.g. between 1 and 10. As mentioned above, thruster drive system 25 may comprise a different number of thruster drives, and the drilling drive system 14 may comprise further components, such as mud pumps, cement pumps, anchor winches and the like. Also, the control unit 30 can be separated into different individual control units, such as a dynamic positioning control unit controlling the thruster drive system 25, a unit for controlling the generators and a further unit for controlling the drilling drive system 14.

Figure 2:
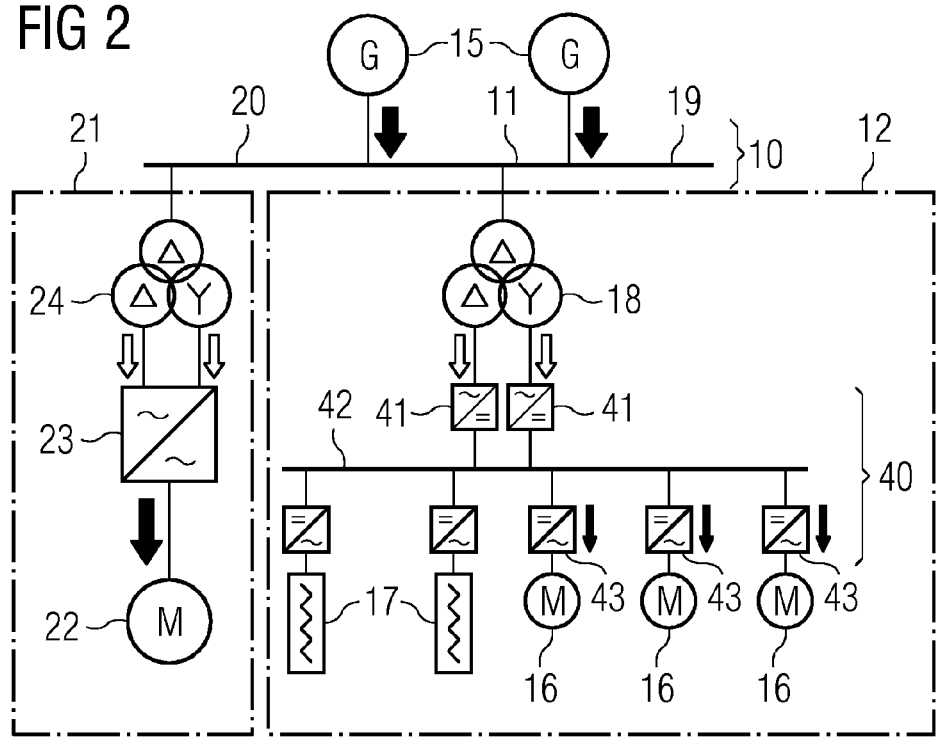
FIG. 2 is a schematic block diagram illustrating a power supply system comprising braking resistors in a first phase of a heave compensation cycle.
Figure 3:
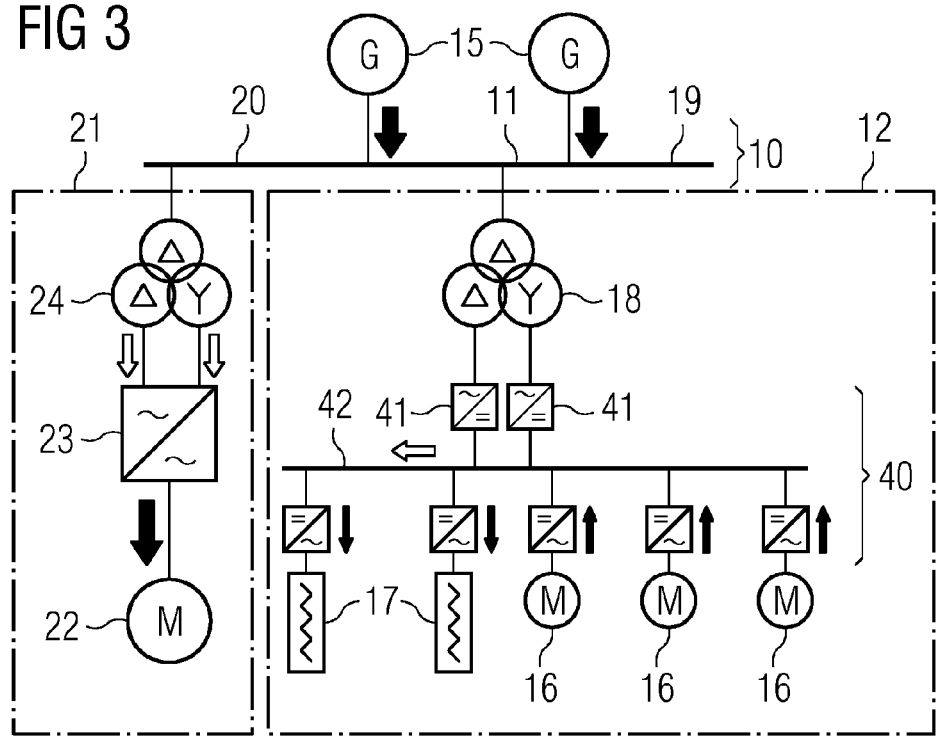
FIG. 3 is a schematic block diagram illustrating a power supply system comprising braking resistors in a second phase of a heave compensation cycle.

FIGS. 2 and 3 illustrate a power supply system according to an example embodiment towards which a drilling drive 25 and an active heave compensator 12 are coupled, which are illustrated in more detail. The first and second power grid sections 11 and 12 are coupled by a common AC Bus 19. FIG. 2 illustrates the first phase of the heave compensation cycle in which the active heave compensator 12 consumes electric power, while FIG. 3 shows the second phase of the heave compensation cycle in which the active heave compensator 12 generates electric power.

In the following, the components of the active heave compensator 12 and the thruster drive 21 are shortly explained before elaborating the energy flow in both examples. Active heave compensator 12 comprises a heave compensating drawworks, in which AC electric motors 16 rotate a winch drum for reeling in and reeling out drilling line. The electric motors 16 are operated by electric power supplied by generators 15. Three phase transformer 18 has two secondary windings, one with a Y-circuit, the other with a Δ-circuit, which provide phase shifted transformed AC voltage. The rectifiers 41 convert the AC voltage into a DC voltage which is distributed on DC Bus 42. The ripples in the voltage in the two "DC-channels" are also phase shifted, thus reducing harmonic distortions in the resulting DC voltage on DC bus 42.

The symbols indexed by reference numeral 43 indicate inverters which convert the DC voltage into an AC voltage with variable frequency, using which the electric motors 16 are operated. By varying the AC frequency, the rotational speed of motors 16 can be varied. Components 41, 42 and 43 thus form a variable speed drive 40 for driving electric motors 16 at the desired speed. Braking resistors 17 are also coupled to DC Bus 42 by inverters.

Thruster drive 21 is configured similarly. Electric power generated by generators 15 is again transformed using the three phase transformer 24, and supplied to the variable speed drive (VSD) 23 which supplies the AC electric motor 22 with AC electric power at variable frequency. The variable speed drive 23 may be configured similarly to the variable speed drive 40 i.e. it may comprise two or more rectifiers, a DC bus and one or more inverters operable at variable frequencies.

It should be clear that the implementations of the active heave compensator 12 and of the thruster drive 21 are only of an illustrative nature, and that these components may as well be implemented in configurations different to the ones illustrated.

The arrows in FIG. 2 indicate the flow of electric power in the first phase of the heave compensation cycle, wherein the width of the arrows indicates the amount of electric power supplied by/to the respective components. The thruster drive 21 is supplied with electric power from the generator 15 and is operated with a relatively constant power output. In the first phase of the heave compensation cycle, the drilling vessel is lowered relative to seabed, so that the drill string needs to be lifted by an operation of electric motors 16. Accordingly, active heave compensator 12 consumes electric power, so that the total load on generators 15 is relatively large as indicated by the wide arrows.

FIG. 3 illustrates the second phase of the heave compensation cycle, wherein the electric energy generated by the electric heave compensator is burned in the braking resistors 17. The thruster drive 21 is operated at the same power as in FIG. 2. The drilling vessel is lifted relative to seabed, so that the drill string needs to be lowered, thus generating electric power in the electric motors 16. The generated electric power is supplied to the braking resistors 17 where it is burned. To burn large amount of excess energy, the braking resistors 17 need to have a considerable size and need to be water-cooled. The total load on the generators 15 is substantially smaller than in FIG. 2, as indicated by the narrow arrows.

Figure 6:
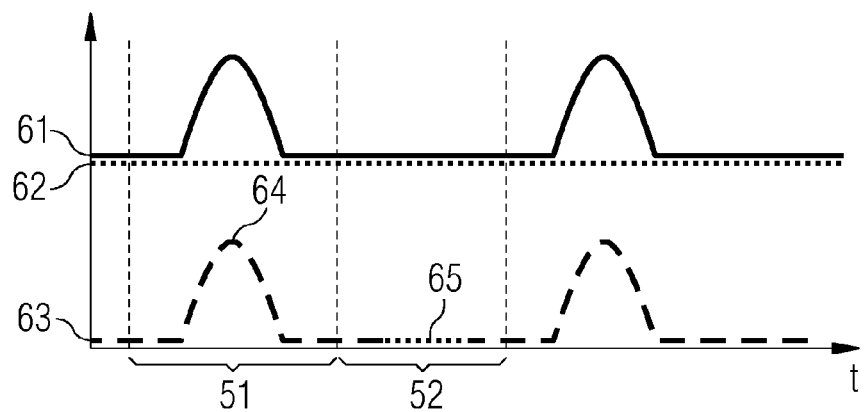
FIG. 6 is a diagram illustrating electric power consumption and generation in a conventional power supply system.

The consumption/generation of electric power over a heave compensation cycle is illustrated in FIG. 6 for the configuration of FIGS. 2 and 3. The first and second phases of the heave compensation cycle are designated with reference numerals 51 and 52, respectively. The curve 61 illustrates the electric power required to be produced by generators 15, i.e. the load on the generators. Curve 62 (small dotted line) illustrates the electric power consumed by the thruster drive 21, which is constant or the heave compensation cycle in the example of FIGS. 2 and 3. Curve 63 (dashed line) illustrates the power consumption of the active heave compensator 12. In the first phase 51 (corresponding to FIG. 2), a large amount of electric power is required by the heave compensator (curve section 64), resulting in a higher load on the generators. In the second phase 52 of the cycle, the active heave compensator 12 requires almost no power, the generated power being burned off in the braking resistors as illustrated with curve section 65 (large dots).

Figure 7:
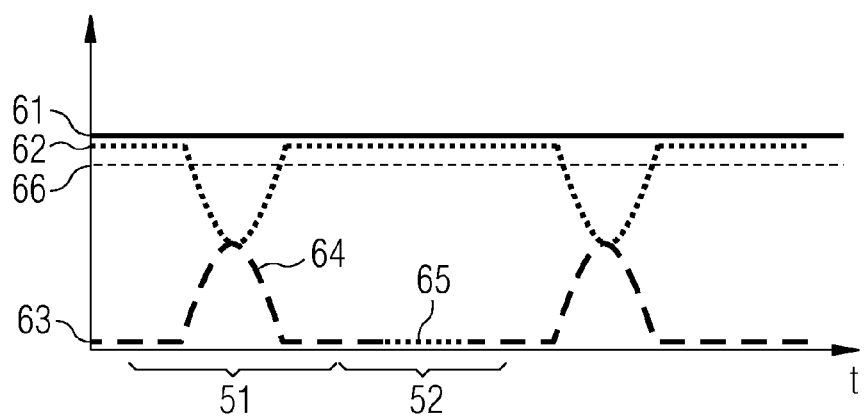
FIG. 7 is a diagram illustrating electric power consumption and generation in a power supply system with a constant load on the generators.

FIG. 7 illustrates a situation in which the control unit is configured to control the flow of electric power in the power supply system such that the load on the generators is kept constant even though power generated by the active heave compensator during the second phase is still burned off by the braking resistors. The electric power supply to the thruster drive is no longer kept constant as illustrated with curve 62, but it is decreased during the time in which the active heave compensator uses large amounts of electric power as illustrated with curve 63. The power that needs to be supplied by the generators thus remains essentially constant (curve 61). Curve 66 illustrates the average electric power that is supplied to the thruster drive during conventional operation, which can be an average electric power that is high enough to ensure a reliable operation of the dynamic positioning system. As the power supplied to the thruster drive is reduced in phase 51, it is correspondingly increased during the rest of the heave compensation cycle, so that the average power over the whole heave compensation cycle corresponds to curve 66, i.e. remains essentially the same.

In one embodiment, the flow of electric power in the system of FIGS. 2 and 3 can now be controlled in such a way that the electric power generated during the second cycle 52 is not completely supplied to the braking resistors 17 (as illustrated in FIG. 3), but is at least partially fed back into the power grid (AC Bus 19) and supplied to the thruster drive 21 which can thus operate at a higher output power without requiring additional energy from generators 15. Note that several configurations are conceivable. As an example, more than 30%, 50% or even 70% of the electric power generated by the active heave compensator during the second phase of the heave compensation cycle may be fed back into the power grid. In other configurations, all the generated power (without considering losses in the system) is fed back into the power grid, as will be explained further below with respect to FIGS. 4 and 5.

Figure 8:
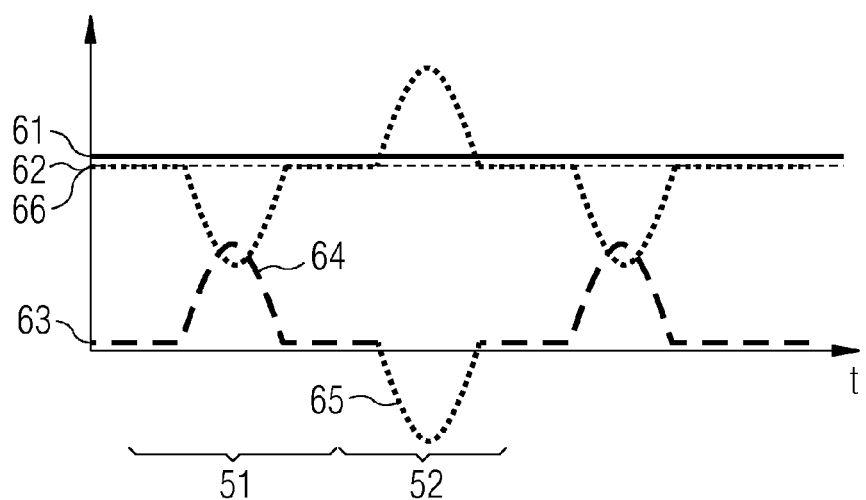
FIG. 8 is a diagram illustrating the power consumption and generation in a power supply system according to an embodiment in which heave compensator and thruster drive have relatively constant combined demands for electric power.

The situation outlined above is illustrated in the diagram of FIG. 8. Curve section 65 illustrates the generation of electric power by the active heave compensator. During this period of time, the electric power supplied to the thruster drive is increased, as illustrated with curve 62 (dotted line). The load on the generators (curve 61) thus remains essentially constant. Note that in FIG. 7, the generators have to supply more electric power in order to be able to supply the average electric power 66 to the thruster drive. In contrast, the average load on the generators is lower in the example of FIG. 8, as the additional power that needs to be supplied to the thruster drive is not produced by the generators, but is taken from the active heave compensator. A lower fuel consumption of the generators can thus be achieved, even during dynamic positioning of operation.

Figure 4:
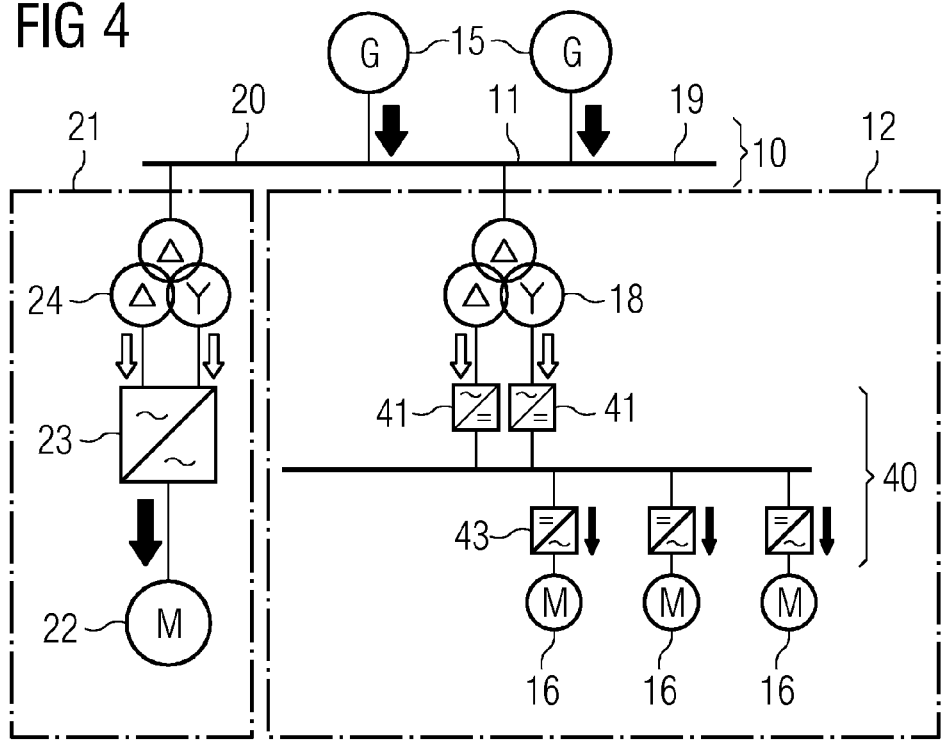
FIG. 4 is a schematic block diagram illustrating a power supply system according to an embodiment in a first phase of a heave compensation cycle.
Figure 5:
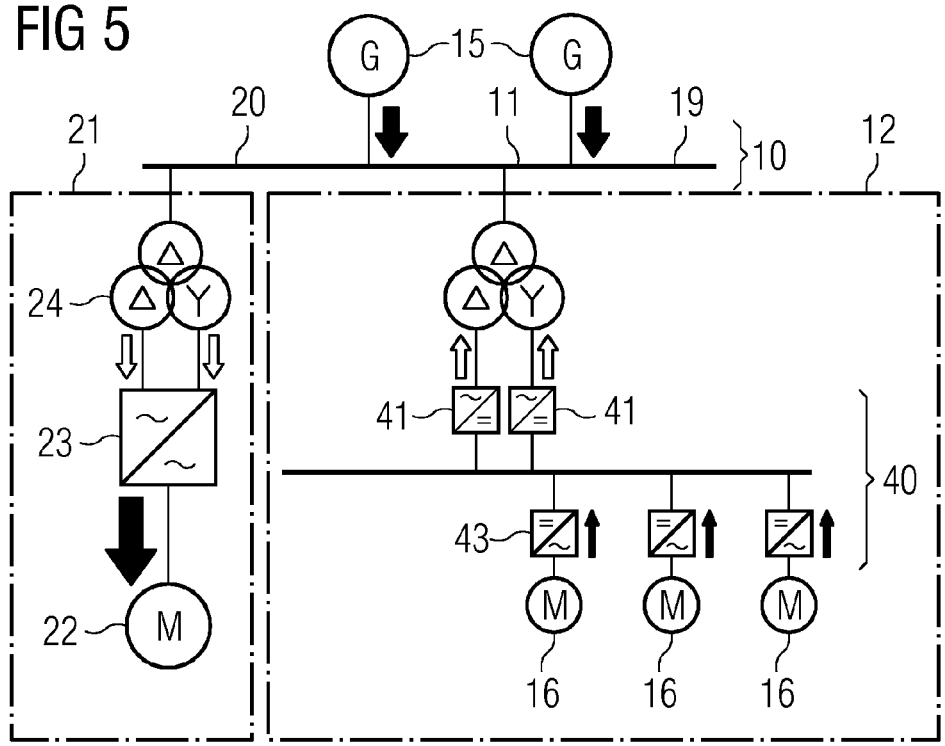
FIG. 5 is a schematic block diagram illustrating a power supply system according to an embodiment in a second phase of a heave compensation cycle.

FIGS. 4 and 5 illustrate an embodiment of the power supply system in which the energy flow corresponds to the one illustrated in FIG. 8. Again, FIG. 4 shows the first phase 51 and FIG. 5 the second phase 52 of the heave compensation cycle. The configuration of the components illustrated in FIGS. 4 and 5 corresponds to the one illustrated in FIGS. 2 and 3, with the exception that the active heave compensator 12 is not provided with braking resistors in the configuration of FIGS. 4 and 5. In the first phase illustrated in FIG. 4, the narrower arrows indicate that less electric power is supplied to the thruster drive 21. The electric power supply to active heave compensator 12 is the same as in FIG. 2, so that as a result, the total electric power that needs to be supplied by generators 15 is lower.

In the second phase 52 illustrated in FIG. 5, more electric power as compared to FIG. 3 is provided to the thruster drive 21. This additional power is supplied by the active heave compensator 12, the arrows indicating a power flow in the opposite direction (power generation). Feeding electric power generated by AC motors 16 back into the power grid with the required AC frequency can for example be achieved by using active rectifiers 41 or by making use of a four quadrant converter (not illustrated). The total load on generators 15 in FIG. 5 is thus the same as in FIG. 3, even though the thruster drive 21 is operated with a higher input power. Consequently, the load on generators 15 can be kept constant in both phases (FIGS. 4 and 5) of the heave compensation cycle.

As all of the generated power is fed back into the power grid in the example of FIGS. 4 and 5, no braking resistors are required. Even though, such braking resistors may be provided, e.g. for taking up a surplus of generated electric power, or when braking is required over a longer period of time, e.g. when lowering the drill string from the drilling vessel to the seabed.

Note that in FIGS. 2 and 3, as well as in FIGS. 4 and 5, the control unit 30 discussed with respect to FIG. 1 and controlling the flow of electrical power in the power supply system 10 is not explicitly shown, but may certainly be present.

Furthermore, it should be clear that the diagrams of FIGS. 6-8 are only schematic and are only given for the purpose of illustration. FIG. 8 for example illustrates the curves of an "ideal" system in which the additional power required during the first phase 51 essentially corresponds to the power generated during the second phase 52. In a real system, these may not be equal, as generally less power will be generated. Nevertheless, the electric power supply to the thruster drive can be adjusted so as to keep the load on the generators essentially constant. Furthermore, it should be clear that although FIGS. 7 and 8 show a straight line 61 illustrating the load on the generators, the load will generally comprise ripples that may vary slightly, e.g. due to further components that are supplied with electric power from the generators. A variation in the load on the generators may also result from a small time lag between the power consumption/generation by the active heave compensator and the corresponding control of the thruster drive. Such variations should be embraced by the term 'substantially constant'.

Summarizing, with embodiments of the disclosed power supply system, a lower fuel consumption of the generators and a more stable frequency on the power grid of the marine drilling vessel may be achieved. This can result in reduced maintenance requirements for the generator set. Furthermore, the braking resistors can be downscaled or removed. Similarly, the inverters coupled between the DC Bus and the braking resistors can be downscaled or removed. Savings in weight, required space and costs may thus be achieved.

What is claimed is:

1. A power supply system for a marine drilling vessel, comprising:
    a first power grid section coupled to a generator configured to generate electric power and further coupled to an electrically powered active heave compensator configured to raise and lower a drill string relative to the marine drilling vessel, wherein the active heave compensator is configured to generate electric power when lowering the drill string, and
    a second power grid section coupled to a generator configured to generate electric power and further coupled to an electrically powered thruster drive of the marine drilling vessel,
    wherein the first power grid section is electrically coupled to the second power grid section, and
    wherein the power supply system configured to supply electric power generated by the active heave compensator during heave compensation to the thruster drive for operating the thruster drive.

2. The power supply system of claim 1, wherein the active heave compensator comprises a heave compensating drawworks comprising one or more electric motors.

3. The power supply system of claim 2,
wherein the first power grid section comprises an AC bus operating at a predetermined AC frequency, and
wherein the electric motor of the heave compensating drawworks is an AC electric motor and is coupled to the AC bus via a variable speed drive, the variable speed drive comprising an active rectifier and configured to convert electric power generated by the AC electric motor to electric power having a frequency that is substantially equal to the frequency at which the AC bus is operated.

4. The power supply system of claim 1, further comprising a control unit configured to control the flow of electric power in the power supply system in such a way that electric power generated by the active heave compensator is supplied to the thruster drive.

5. The power supply system of claim 1,
wherein the active heave compensator is configured to compensate for a heave motion of the marine drilling vessel caused by sea waves,
wherein a heave compensation cycle comprises a first phase in which the drill string is raised and the active heave compensator consumes electric power and a second phase in which the drill string is lowered and the active heave compensator generates electric power, and
wherein the power supply system is configured to supply the electric power generated during the second phase to the thruster drive.

6. The power supply system of claim 5, further comprising a control unit configured to operate the thruster drive at a lower power during the first phase of the heave compensation cycle and at a higher power during the second phase of the heave compensation cycle.

7. The power supply system of claim 1,
wherein the thruster drive is part of a propulsion system of the marine drilling vessel, the propulsion system comprising a dynamic positioning system, and
wherein the power supply system is configured so as to supply an average electric power to the thruster drive that is above a threshold power required by the dynamic positioning system for position keeping.

8. The power supply system of claim 1, wherein the power supply system is configured to control the supply of electric power to the thruster drive in such a way that the sum of the electric power consumed by the thruster drive and of the electric power consumed and generated by the active heave compensator is substantially constant over a heave compensation cycle.

9. A method of controlling a power supply system of a marine drilling vessel,
providing a supply system comprising a first power grid section coupled to a generator configured to generate electric power and further coupled to an electrically powered active heave compensator configured to raise and lower a drill string relative to the marine drilling vessel, wherein the active heave compensator is configured to generate electric power when lowering the drill string and a second power grid section coupled to a generator configured to generate electric power and further coupled to an electrically powered thruster drive of the marine drilling vessel, wherein the first power grid section is electrically coupled to the second power grid section, the method comprising:
generating electric power by means of the active heave compensator when the active heave compensator lowers the drill string during heave compensation,
supplying the generated electric power to the thruster drive, and
operating the thruster drive with the supplied electric power.

10. The method of claim 9,
wherein the active heave compensator is configured to compensate for a heave motion of the marine drilling vessel caused by sea waves, wherein a heave compensation cycle comprises a first phase in which the drill string is raised and the active heave compensator consumes electric power and a second phase in which the drill string is lowered and the active heave compensator generates electric power,
wherein the step of supplying the generated electric power to the thruster drive is performed during the second phase of the heave compensation cycle.

11. The method of claim 10, further comprising controlling the operation of the thruster drive such that the thruster drive is operated at a lower power during the first phase of the heave compensation cycle and at a higher power during the second phase of the heave compensation cycle.

12. The method of claim 9,
wherein the thruster drive is part of a propulsion system of the marine drilling vessel, the propulsion system comprising a dynamic positioning system, and
wherein the method further comprises controlling the supply of electric power to the thruster drive in such a way that an average electric power is supplied to the thruster drive that is above a threshold electric power required by the dynamic positioning system for position keeping.

13. The method of claim 9, further comprising controlling the supply of electric power to the thruster drive in such a way that the sum of the electric power consumed by the thruster drive and of the electric power consumed and generated by the active heave compensator is substantially constant over a heave compensation cycle.

14. The method of claim 9, further comprising: controlling the supply of electric power to the thruster drive in such a way that the load on the one or more generators coupled to the first and second power grid sections is substantially constant over a heave compensation cycle.

* * * * *